(No Model.) 4 Sheets—Sheet 1.

H. T. GILES.
VALVE GEAR.

No. 372,666. Patented Nov. 8, 1887.

WITNESSES: INVENTOR (No Model.) 4 Sheets—Sheet 2.

H. T. GILES.
VALVE GEAR.

No. 372,666. Patented Nov. 8, 1887.

WITNESSES: Jos H Blackwood

INVENTOR Henry T Giles
Attorney (No Model.)  4 Sheets—Sheet 3.

H. T. GILES.
VALVE GEAR.

No. 372,666.  Patented Nov. 8, 1887.

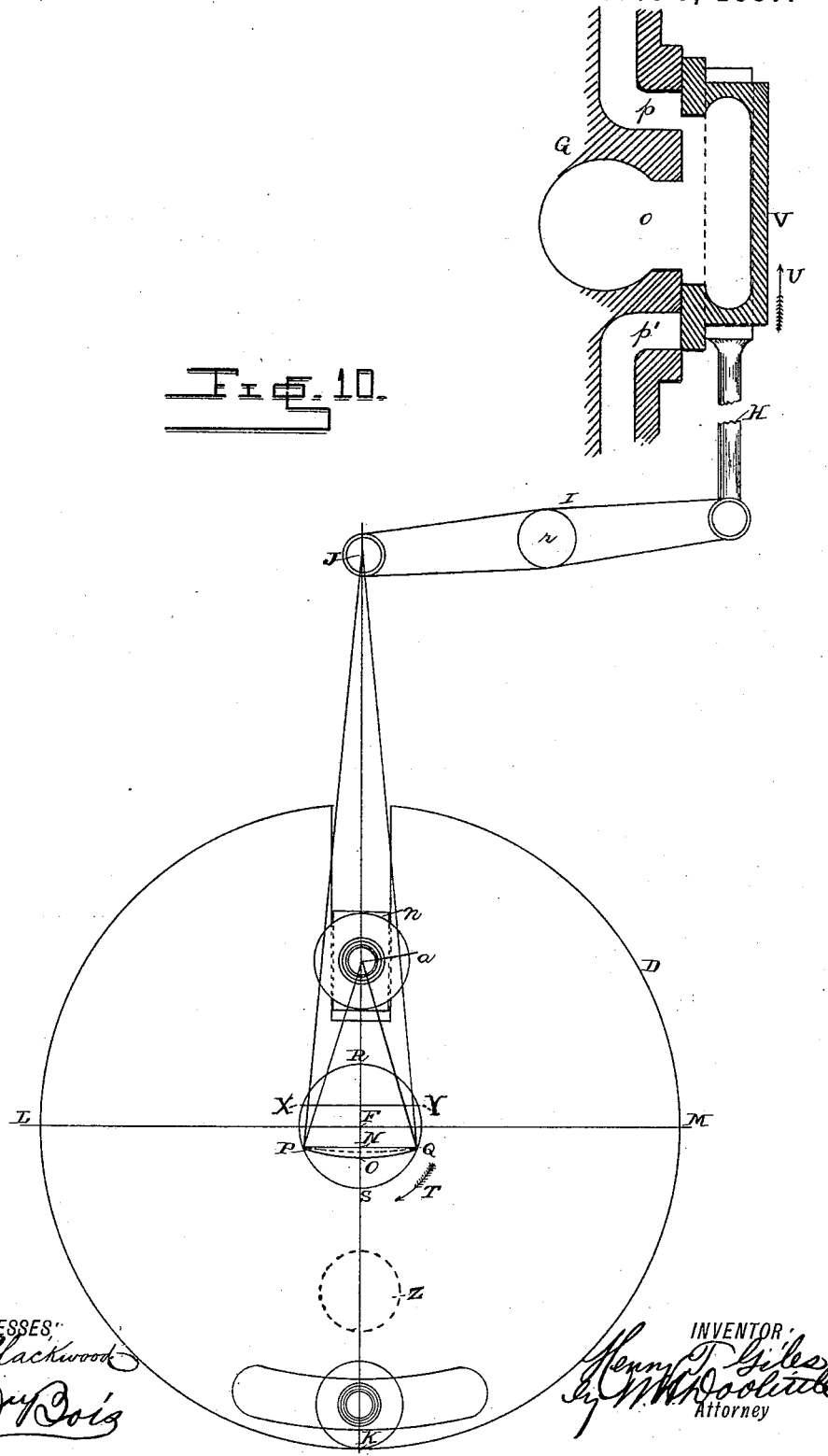

UNITED STATES PATENT OFFICE.

HENRY T. GILES, OF WASHINGTON, DISTRICT OF COLUMBIA, ASSIGNOR OF ONE-FOURTH TO ALBERT M. COWELL, OF SAME PLACE.

VALVE-GEAR.

SPECIFICATION forming part of Letters Patent No. 372,666, dated November 8, 1887.

Application filed October 5, 1886. Serial No. 215,385. (No model.)

*To all whom it may concern:*

Be it known that I, HENRY T. GILES, a citizen of the United States, residing at Washington, in the District of Columbia, have invented certain new and useful Improvements in Valve-Gear; and I do hereby declare the following to be a full, clear, and exact description of the invention, such as will enable others skilled in the art to which it appertains to make and use the same.

This invention relates to valve-gear for operating the valves of steam-engines, and belongs to the class of gear whereby the motion of the engine may be reversed and a variable cut-off is provided.

The object of the invention is to provide a gear which will accomplish these results, which will be constructed to give the desired lap and lead to the valves, which will be simple and economical in construction, easy in operation, and which will subject the various parts to the minimum amount of wear.

The invention is illustrated in the accompanying drawings, in which—

Figure 1:
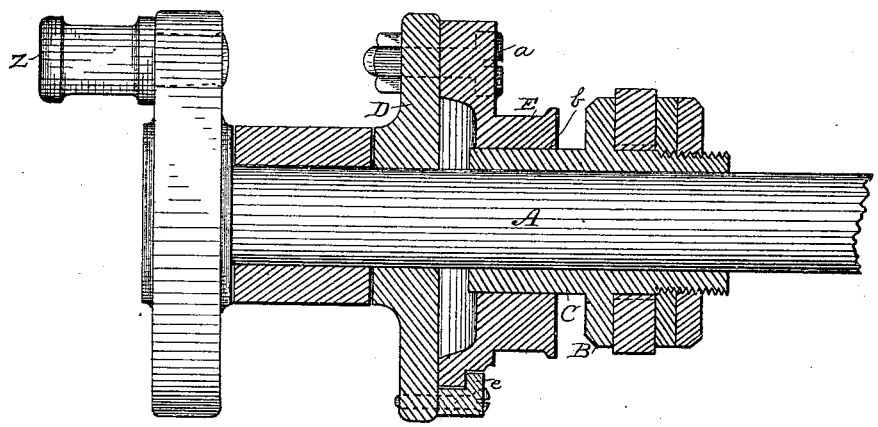
Figure 2:
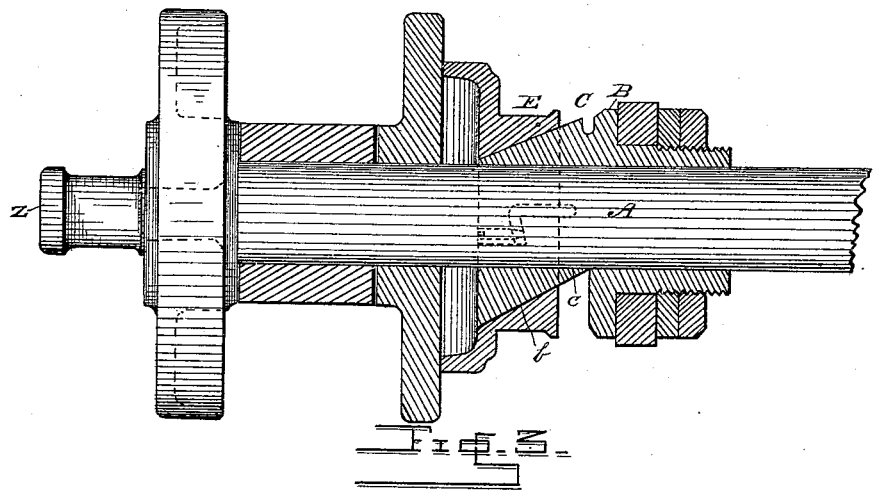
Figure 3:
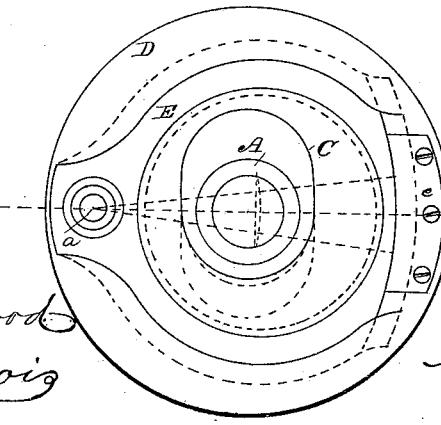
Figure 4:
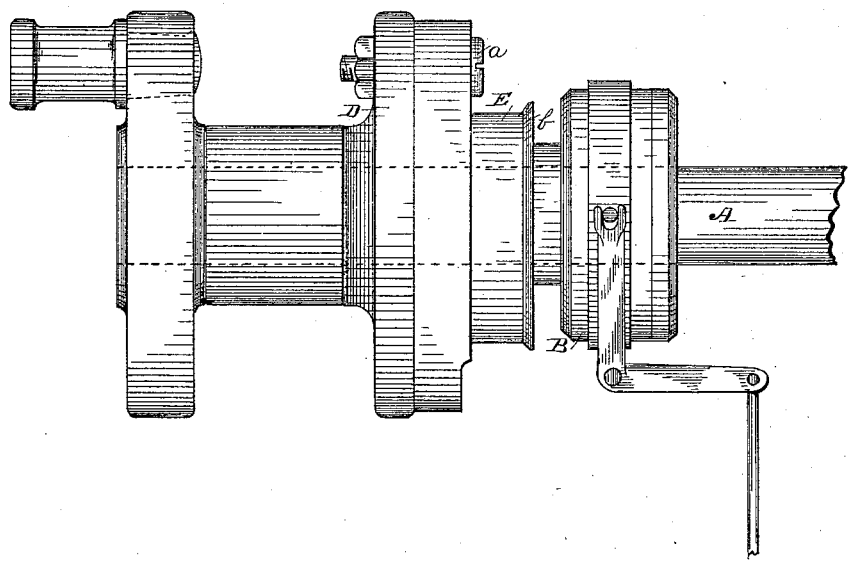
Figure 5:
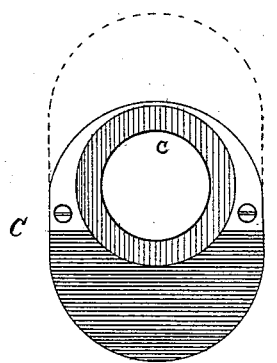
Figure 6:
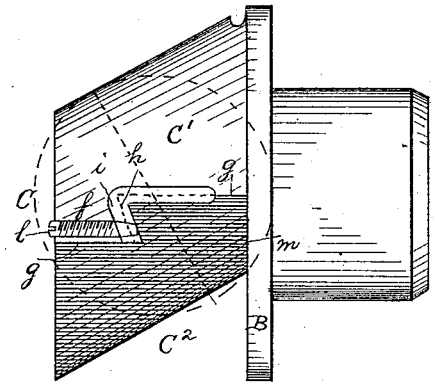
Figure 7:
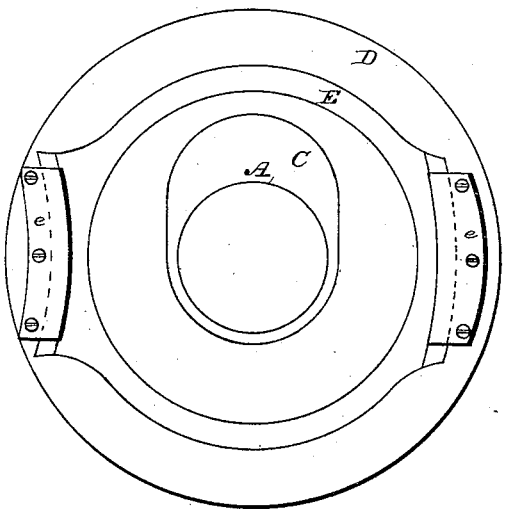
Figure 8:
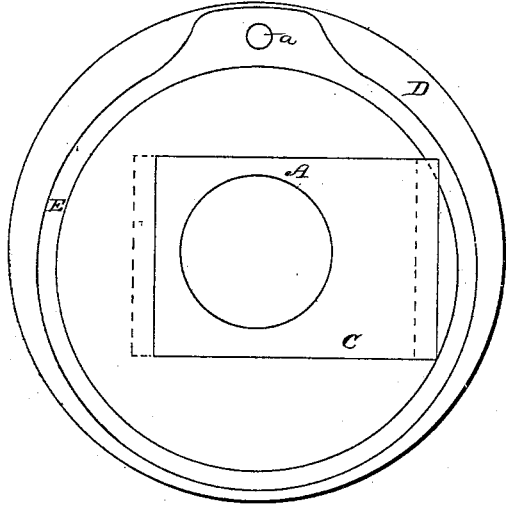
Figure 9:
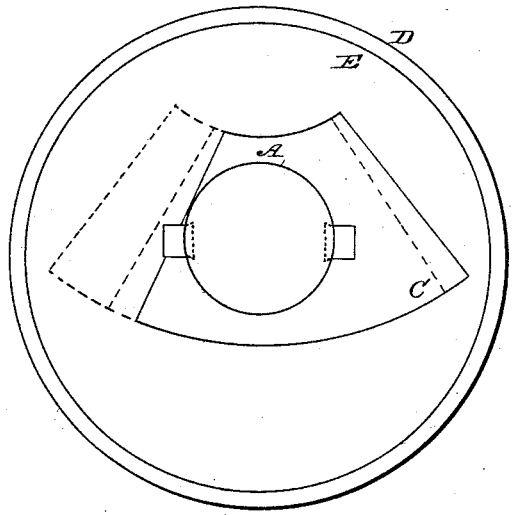

Figure 1 is a longitudinal section of the valve-gear along the driving-shaft. Fig. 2 is a similar section in a plane at right angles to that in Fig. 1. Fig. 3 is a front outline view of the eccentric, showing in dotted lines its movement in both directions. Fig. 4 is a side view of the valve-gear. Figs. 5 and 6 are details of the cam. Figs. 7, 8, and 9 are views of modifications, each view being similar to Fig. 3; and Fig. 10 is a diagram illustrating the operation of the device.

The preferred construction will be first described, and with reference only to the more essential features of the invention.

A is the driving-shaft of an engine, and E the eccentric, which is suitably connected with the valve in any usual or desirable manner to operate the same. This eccentric is not coupled directly to the shaft, but is pivoted at $a$ to a disk, D, which is rigidly secured to the shaft, so as to always turn therewith. The eccentric is formed with a central aperture, $b$, which in the preferred construction is elliptical in outline, through which aperture the shaft passes. This aperture is larger than the cross-section of the shaft, so that the eccentric can within limits swing on its pivot $a$.

Fitted within the aperture of the eccentric is a cam, C. This cam is secured to a collar, B, which surrounds the shaft, and is free to both slide and turn upon the shaft. Both the cam and its collar are entirely unconnected with the shaft by feathers or the like, so that they can slide and turn freely thereon. The cam itself is a true cylinder, having a central bore or aperture, $c$, through which the shaft is passed. The axis of this central bore, which coincides with the axis of the shaft A, is at an angle (say thirty degrees) to the axis of the cam. The effect of this cam construction is that the cam is elliptical in a cross-section perpendicular to the axis of the shaft, as shown in Fig. 6. The extent of this ellipticity is a function of the travel of the valve, and is determined by it. This cam fits in the aperture $b$ of the eccentric, the axis of which is inclined at the same angle as that of the cam, so as to accommodate the cam. The ellipticity of the cam prevents it from turning independently of the eccentric, so that the cam rotates with the eccentric and the shaft. The cam is, however, free to slide longitudinally in the eccentric, the eccentric being held from such movement by its connection with the rigid disk D. As long as the cam remains in a single position in respect to the length of the shaft the disk, eccentric-cam, and shaft all turn together. The eccentric cannot move on its pivot, and there is no relative movement between any of these parts. The result is that while the engine is running there is no friction (and consequently no wear) between the several parts. If the cam is at its extreme limit in one direction on the shaft, the eccentric will be at its greatest eccentricity to the shaft, and consequently the valve will be moved to its greatest extent and the engine will run at its greatest capacity in one direction. If, now, the cam is moved along the shaft, the eccentricity will grow less and less, with a corresponding diminution of the travel of the valve, until the cam reaches the center of its movement, when the eccentric will be at its minimum eccentricity. Further movement of the cam will move the eccentric across the shaft and move the valve in the opposite direction, thus reversing the engine. Thus by sliding the cam on the shaft the engine may be reversed and a variable cut-off is provided.

As the cam is moved along the shaft the eccentric is turned on its pivot, and since the cam cannot turn within the eccentric, it is necessary that the cam itself have a slight rotary movement on the shaft. Thus every time the cam is moved it has a compound movement the resultant path of which is slightly spiral. It will be seen that the only friction between the several parts is while the valves are being shifted. The extent of the sliding movement of the cam will be determined by the travel of the valve and the angle between the axes of the cam and shaft.

In case the valve of the engine has no lap and no advance lead is required, the eccentric, when the cam is at its central position, would be concentric with the shaft, and no movement would be imparted to the valve. In order, however, to provide for the lap and lead, the eccentric is permanently eccentric, its minimum eccentricity being when the cam is at its central position.

The extent of the permanent eccentricity will be determined by the extent of lap and the required lead, and will be equal to their combined extent. The center of the eccentric which is thus determined will, owing to the pivotal arrangement of the eccentric, move in a curved path when the cam is moved. This curvilinear path is of great importance, and gives great advantages over those eccentrics which move in a rectilinear path across the shaft. In order that the effects of this curved path may be more clearly understood, it will be explained in connection with the diagram shown in Fig. 10. In this diagram, which represents the operation of the invention when applied to a locomotive, D is the disk to which the eccentric is attached; a, the pivotal point of the eccentric. F is the center of the shaft A. G is a portion of the steam-cylinder, showing the entrance-ports p p' and the exhaust-ports o. V is the valve, H the valve-rod, and I a rocker-arm pivoted at r. The rocker-arm I is connected at its free end J with the eccentric by an eccentric-rod. The dotted line Z represents the position of the crank-pin. When, however, a direct connection is made with the valve without the intervention of a rocker-arm, then the pivotal point of the eccentric stands in line with the crank-pin, as if it were turned through an arc of one hundred and eighty degrees in the diagram. In the diagram the point J is shown in a straight line with the centers a and F and the center of the crank-pin Z, and through these points is drawn the line J K. At right angles to this line and through the point F is drawn the line L M. Assuming the lap of the valve to be equal to the line F N, the line P Q is drawn through N parallel with the line L M, and on the other side of the line L M is drawn the line X Y, also at a distance from the line L M equal to that of the line P Q. The perpendicular distance between the lines P Q and X Y represents the combined lap of both ends of the valve. With F as a center, the circle P Q R S is drawn having a diameter equal to the extreme travel of the valve, or proportional thereto, depending of course on the levers and rods connecting the eccentric to the valve. Now, when the valve has its maximum travel, as it will when the cam is at its extreme limit in either direction, the circle P Q R S will represent the path of the center of the eccentric. When this center is at the point Q, for example, where the lap-line P N Q crosses the circle, the valve and connecting-rods will be in the position shown, with the port p' just ready to open and the other port, p, partly open to the exhaust.

The valve and valve-ports of the engine are of course designed and proportioned on the assumption that the engine will be worked at its full capacity, and hence the normal lap and lead are determined and fixed by the proportion of these parts. Assume, now, that the eccentric is rotating in the direction of the arrow T. The first effect will be to slide the valve V and open the port p'. When the point S is reached, the port p' will be opened to its maximum extent, and when the point P is reached the port will be again closed and the positions will again be as in the diagram. During the passage from Q to P the other port, p, has been open to the exhaust, and it continues to be so open until after the point P is passed. When the point X is reached, the port p will begin to open and will continue to open until the part R is reached, when it will be opened to its maximum extent. When the point Y is reached, the port p will again be closed. During this passage from X to Y the other port, p', has been open to the exhaust. In the diagram the line J Q represents the position of the eccentric-rod at the beginning of the cycle of movements, when the eccentric is rotating in the direction of the arrow T. In reversing the engine the eccentric-rod is moved to the position indicated by the line J P. When this is done, the eccentric will rotate in a direction opposite to that of the arrow T.

When the cam is moved to vary the point of cut-off, the center of the eccentric moves along the arc P O Q, having the point a as its center. Now, if the center of the eccentric should be moved in an arc having the point J as a center, (this arc being represented by the dotted line P Q,) the movements of the cam and eccentric would have no effect upon the position of the valve, and no advanced lead would be obtained. But the radius a Q must always be less than the radius J Q, and hence there is always a space between the arcs drawn from those centers, that space being determined by the relative lengths of the arcs, and it is this difference between these two arcs which gives the advanced lead at short cut-offs. Since the center of the eccentric moves in the arc Q O P, if it is assumed that the eccentric is moved in the direction of the arrow T, movement in that arc will slide the valve, opening the port $p'$. The extent of this opening is the advanced lead obtained, and this lead becomes greater and greater as the eccentric approaches the point O, which is its position of least eccentricity. Now, it is evident that if, instead of moving in a curved path, the eccentric had moved in a straight path, as Q N P, not only would no advance lead be obtained, but there would be a negative lead, since movement along that line would depress the valve, as shown in the diagram, and still further close the port $p'$. This is true of all those eccentrics which move in a straight line, and is a great practical objection to them.

In order that the free-moving part of the eccentric E—that is, the portion most remote from the pivot—may not be affected by the longitudinal movement of the cam, it is held from movement from the disk D by means of a guide lip or flange, $e$, formed on the disk, which does not interfere with the oscillation of the eccentric. A headed pin, as indicated in Fig. 10, carried by the eccentric working in a circular slot in the disk would be an equivalent construction.

To obviate any cramping between the cam and eccentric during the shifting of the valves, which might occur in case of unequal wear, the eccentric may be given a slight play at right angles to its path of oscillation by having its pivot-pin work in a block which slides in a slot, $n$, on the disk D, as shown in Fig. 10.

In order to give as nearly as possible a uniform bearing-surface at all times between the cam and eccentric, and at the same time make the cam as short as possible, so as to minimize the friction between the cam and shaft, the eccentric is hollowed out on the side next the disk D, so as to give room for the cam to move in that direction. This construction also permits as much of the surface of the cam to be protected as is possible.

To take up the wear on the surface of the cam, the cam is made in two pieces. One of these pieces, C′, is integral with the collar B, and the other, C², is detachable. The piece C′ has an overhanging part, $f$, which fits in a recess in the part C². There are thus formed two faces, $g\ g$, parallel with the axis of the shaft A, between the pieces C′ C². The two contacting faces of the two pieces are connected by an inclined face, $h$. A groove, $i$, is formed in these adjacent faces into which enters the end of a screw, $l$, which passes through the overhanging part $f$. This screw, pressing against the inclined face $h$, holds the part C² snugly and firmly against the part C′, and, fitting in the groove $i$, it prevents any lateral displacement of the part C². Now, in case it is necessary to take up wear on the outer surface of the cam, the piece C² is removed and its face $m$, which rests against the collar B, is dressed off a proper amount. The screw $l$ is then turned farther in until the part C² fills up the space in the aperture of the eccentric, thus taking up the wear. The faces $g\ g$ secure the constant parallelism of the opposite edges of the bearing-surface of the cam. This is the preferred way of taking up the wear. Any other known way can, if desired, be employed—such as babbitting, for example.

The essential characteristics of the invention as thus described are an eccentric capable of oscillation in a curved path and a shifting cam movable lengthwise on the shaft for varying the eccentricity of the eccentric. Now, the same results may be accomplished without pivoting the eccentric to the disk and without the cam being cylindrical. Modifications showing different constructions for accomplishing the same result are shown in Figs. 7, 8, and 9.

In Fig. 7 the same kind of a cam is shown; but the eccentric is not shown pivoted to the disk D. Instead of pivoting, the eccentric is caused to travel in a circular path by being held between curved guides arranged opposite to each other on the disk. Opposite curved slots on the disk and two headed bolts on the eccentric would be an equivalent construction. This movement of the eccentric between curved guides is particularly desirable in cases where only a small lead is required, since the curvature may be made as slight as may be required. It is only essential that the curvature be greater than an arc having the eccentric-rod as its radius.

In Fig. 8 the eccentric is shown pivoted; but the cam is rectangular in cross-section. Such a cam will accomplish the purpose equally well, except that it is more difficult to construct and fit and cannot be arranged to take up the wear as well as a cylindrical cam.

In Fig. 9 is shown a construction in which the cam is incapable of rotating on the shaft, being feathered thereto, and has concentric faces on opposite sides, which sides constitute the guides on which the eccentric turns. The eccentric must of course be held from longitudinal movement with the cam. This shifting and reversing gear, it will be observed, occupies a very small space—but little more than the eccentric itself. The result is that it is exposed very little to outside deteriorating causes, and it may be easily boxed in, so as to protect it from dust, &c. This renders the invention particularly applicable to railway-locomotives, the valve-gear of which is subjected in a great degree to flying sand, dust, and cinders, which rapidly ruin the link-motions usually employed.

I claim as my invention—

1. A rotating shaft and an eccentric rotating with said shaft and having an oscillating movement in a curved line, in combination with a shifting cam having a sliding movement on said shaft, substantially as set forth.

2. A rotating shaft and an eccentric rotating with said shaft, said eccentric having an aperture through which said shaft passes, and having an oscillating movement in a curved line, in combination with a shifting cam which slides on said shaft and through the aperture in said eccentric, the axis of said cam being inclined to that of the shaft, substantially as set forth.

3. A rotating shaft and an eccentric rotating with said shaft, said eccentric having an aperture through which said shaft passes, and having an oscillating movement in a curved line, in combination with a shifting cam which slides on said shaft and through the aperture in said eccentric, said cam being a cylinder whose axis is at an angle to that of the shaft, substantially as set forth.

4. A rotary shaft, a disk fixed thereto, and an eccentric pivoted to said disk and having an aperture through which said shaft passes, in combination with a shifting cam which slides on said shaft through the aperture in said eccentric, substantially as set forth.

5. A rotary shaft, a disk fixed thereto, and an eccentric pivoted to said disk and having an aperture through which said shaft passes, in combination with a shifting cam which has a sliding rotary motion on said shaft within the aperture in said eccentric, substantially as set forth.

6. The cam constructed in two parts, the adjacent faces of which are parallel with the axis of the shaft, the removable part having an inclined face, against which bears a screw carried by the fixed part, substantially as set forth.

In testimony whereof I affix my signature in presence of two witnesses.

HENRY T. GILES.

Witnesses:
 JOS. H. BLACKWOOD,
 C. S. DRURY.